US007593646B2

(12) United States Patent
Vassilieva et al.

(10) Patent No.: US 7,593,646 B2
(45) Date of Patent: Sep. 22, 2009

(54) UPGRADED OPTICAL COMMUNICATION SYSTEM WITH INCREASED TRANSMISSION CAPACITY AND METHOD

(75) Inventors: Olga I. Vassilieva, Plano, TX (US); Takeshi Hoshida, Tokyo (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 12/332,755

(22) Filed: Dec. 11, 2008

(65) Prior Publication Data

US 2009/0092395 A1 Apr. 9, 2009

Related U.S. Application Data

(62) Division of application No. 10/394,921, filed on Mar. 22, 2003, now Pat. No. 7,515,834.

(51) Int. Cl.
*H04B 10/04* (2006.01)

(52) U.S. Cl. ...................................... 398/182; 398/188

(58) Field of Classification Search ..................... 398/2, 398/22-25, 33, 38, 182, 185, 188, 194, 202
See application file for complete search history.

(56) References Cited

U.S. PATENT DOCUMENTS 6,592,274 B2 * 7/2003 Kahn et al. ................. 398/141
2002/0018267 A1 2/2002 Sun et al. .................... 359/161
2003/0090768 A1 5/2003 Liu et al. .................... 359/183
2003/0147585 A1 8/2003 Kikuchi et al. ................ 385/24
2005/0005225 A1 * 1/2005 Johnson et al. ............. 714/758
2006/0056845 A1 3/2006 Parsons et al. ................ 398/41

OTHER PUBLICATIONS

Miyamoto et al., "320 Gbit/s (8×40 Gbit/s) WDM transmission over 367-km zero-dispersion-flattened line with 120-km repeater spacing using carrier-suppressed return-to-zero pulse format," OAA, PdP4, pp. 1-4, 1999.

Miyano et al., "Suppression of degradation induced by SPM/XPM+GVD in WDM transmission using a bit-synchronous intensity modulated DPSK signal," Fifth Optoelectronics and Communications Conference (OECC) Technical Digest, 14D3-3, pp. 580-581, Jul. 2000.

Vassilieva et al., Numerical comparison of NRZ, CS-RZ and IM-DPSK formats in 43 Gbit/s WDM transmission, LEOS, 2 pages, 2001.

(Continued)

*Primary Examiner*—Dalzid Singh
(74) *Attorney, Agent, or Firm*—Baker Botts L.L.P.

(57) ABSTRACT

A method for upgrading a wavelength division multiplex (WDM) optical communication system includes replacing an installed transmitter operable to transmit a data stream at a defined bit rate with a return-to-zero M-ary phased shift keying (RZ-mPSK) transmitter operable to transmit the data stream at the defined bit rate and at least one other data stream at the defined bit rate together in an RZ-mPSK signal having a combined bit rate at least double the defined bit rate and a symbol rate equal to the defined bit rate. An installed receiver operable to receive the data stream at the defined bit rate is replaced with an RZ-mPSK receiver operable to recover the data stream at the defined bit rate and the at least one other data stream at the defined bit rate from the RZ-mPSK signal.

8 Claims, 3 Drawing Sheets

OTHER PUBLICATIONS

Ralston et al., "Spectrally Efficient and Impairment-Robust Modulation Techniques for 40 Gb/s Optical Transmission Systems," National Fiber Optic Engineers Conference, pp. 317-324, 2002.

Ralston et al., "Advanced modulation and signal processing techniques for 40 Gb/s optical transmission systems," Proceedings of SPIE, vol. 4872, pp. 24-31, 2002.

Rasmussen et al., "Demonstration of Automatic, Simultaneous Compensation of PMD and Chromatic Dispersion in a 44×43Gbit/s Transmission over 6×100km High-PMD SMF," ECDC, PD4.5, 2 pages, 2002.

Gnauck et al., "2.5 Tb/s (64×42.7 Gb/s) Transmission Over 40×100 km NZDSF Using RZ-DPSK Format and All-Raman-Amplified Spans," OFC, FC2-1-FC2-3, 2002.

Wree et al., "RZ-DQPSK Format with High Spectral Efficiency and High Robustness Towards Fiber Nonlinearities," ECOC, g.6.6, 2 pages, 2002.

U.S. Appl. No. 10/052,886 entitled "System and Method for Multi-Level Phase Modulated Communication", inventors Seemant Choudhary et al., 29 pages of specification, claims and abstract and 4 sheets of drawings, Jan. 18, 2002.

Griffin et al., "Optical Differential Quadrature Phase-Shift Key (oDQPSK) for High Capacity Optical Transmission," Wednesday Afternoon, OFC, pp. 367-368, Mar. 20, 2002.

Ooi et al., "3.5 Tbit/s (43-Gbit/s×88 ch) transmission over 600-km NZDSF with VIPA variable dispersion compensators," Thursday Afternoon, OFC, pp. 555-556, Mar. 21, 2002.

Kahn, et al., "Channel Capacity of WDM Systems Using Constant-Intensity Modulation Formats," Thursday Afternoon, OFC, pp. 731-733, Mar. 21, 2002.

"StrataLight focuses on low-cost capacity upgrades for existing long-haul . . . ," 1 page, Nov. 2002.

Hoshida et al., "Optimal 40 Gb/s Modulation Formats for Spectrally Efficient Long-Haul DWDM Systems," Journal of Lightwave Technology, vol. 20, No. 12, pp. 1989-1996, Dec. 2002.

* cited by examiner

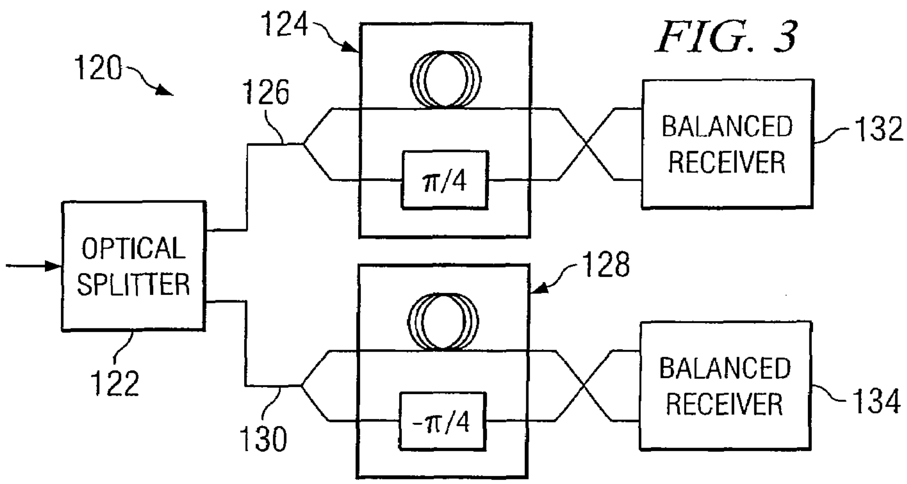
FIG. 3
FIG. 4
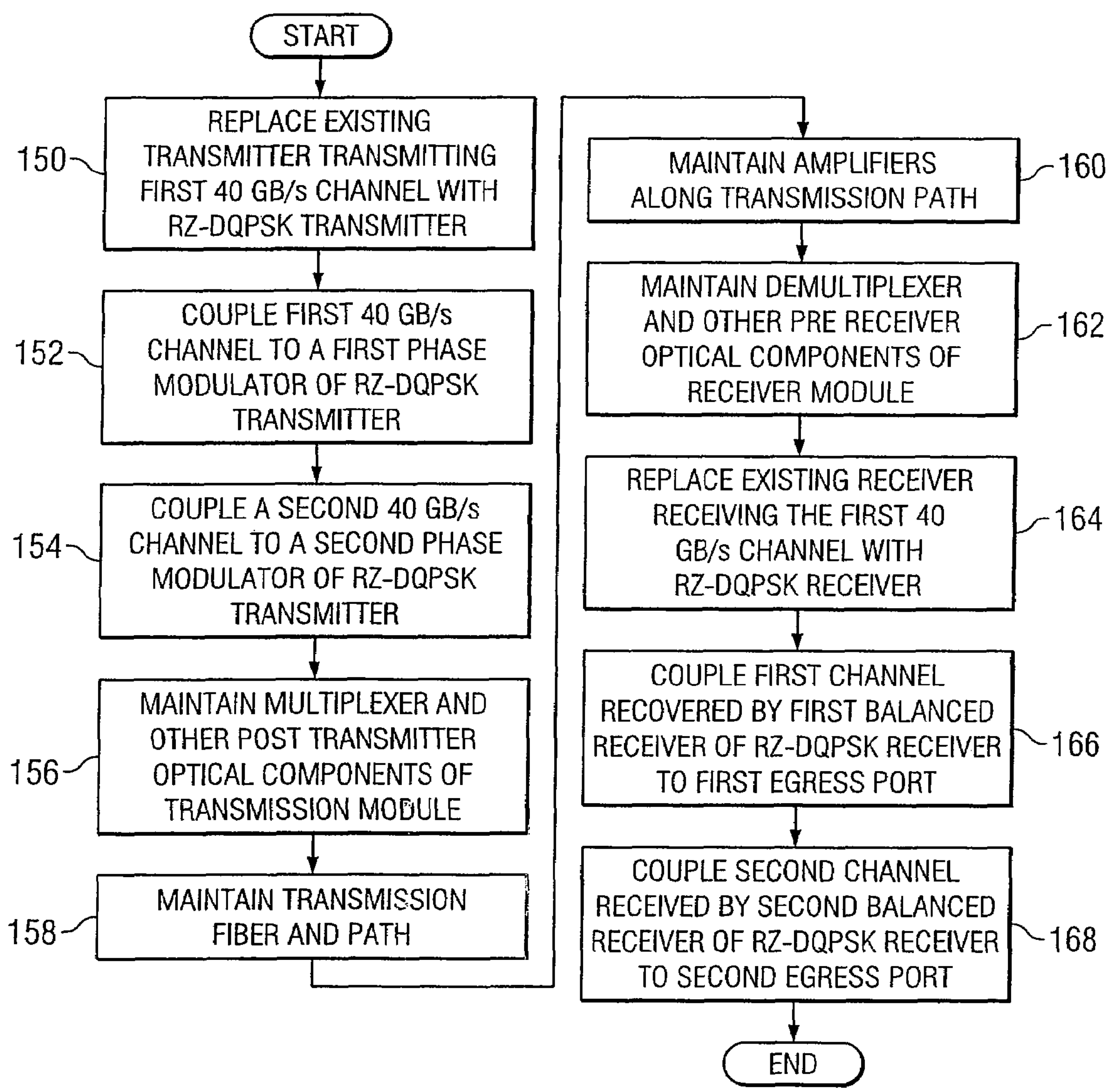

UPGRADED OPTICAL COMMUNICATION SYSTEM WITH INCREASED TRANSMISSION CAPACITY AND METHOD

CROSS-REFERENCE TO RELATED APPLICATION

This Application is a divisional application of U.S. application Ser. No. 10/394,921, filed Mar. 22, 2003 and entitled “Upgraded Optical Communication System with Increased Transmission Capacity and Method.”

TECHNICAL FIELD

The present invention relates generally to optical communication networks and, more particularly, to an upgraded optical communication system with increased transmission capacity and method.

BACKGROUND

Telecommunications systems, cable television systems, and data communication networks use optical networks to rapidly convey large amounts of information between remote points. In an optical network, information is conveyed in the form of optical signals through optical fibers. Optical fibers comprise thin strands of glass capable of transmitting the signals over long distances with very little loss. The optical signals have at least one characteristic modulated to encode audio, video, textual, real-time, non-real-time and/or other suitable data.

In an optical network, transmitter and receiver optical components as well as the transmission fiber and amplifiers are selected, configured and positioned for predefined transmission rates. In addition, node electronics are configured to operate at the predefined rate. Upgrading of the network to increase transmission rates, and thus capacity, typically includes replacing, reconfiguring and/or repositioning optical components in the node and fiber as well as replacing the node electronics.

SUMMARY

An upgraded optical communication system with increased transmission capacity and method are provided. In one embodiment, conventional transmitters and receivers of a wavelength division multiplexed (WDM) network may be replaced with return-to-zero M-ary phase shift keying (RZ-mPSK) transmitters and receivers to increase transmission capacity without upgrading other optical components.

More specifically, in accordance with a particular embodiment of the present invention, a method for upgrading a WDM optical communication system includes replacing an installed transmitter operable to transmit a data stream at a defined bit rate with an RZ-mPSK transmitter operable to transmit the data stream at the defined bit rate and at least one other data stream at the defined bit rate together in an RZ-mPSK signal having a combined bit rate at least double the defined bit rate and a symbol rate equal to the defined bit rate. An installed receiver operable to receive the data stream at the defined bit rate is replaced with an RZ-mPSK receiver operable to recover the data stream at the defined bit rate and the at least one other data stream at the defined bit rate from the RZ-mPSK signal.

Technical advantages of one or more embodiments of the system and method may include doubling or otherwise increasing the transmission capacity of an optical channel by replacing non return-to-zero (NRZ) based or other suitable installed transmitter and receiver, or transponders, with RZ-mPSK-based transmitter and receiver, or transponders. Other advantages of one or more embodiments may include maintaining the same speed electronics and optical components designed and installed for the lower transmission capacity transponders. For example, existing multiplexer, demultiplexer, optical filters, and optical amplifiers as well as polarization mode dispersion and chromatic dispersion control components designed and installed for NRZ based transponders may be used by the higher rate RZ-mPSK-based transponders. In addition, transmission distances and fiber may be maintained. Thus, lower equipment and operational cost per bit rate may be provided as well as faster time to implement an upgrade.

It will be understood that none, some, or all embodiments may include the above enumerated technical advantages. It will be further understood that the method and system may include other technical advantages that will be apparent from the following figures, descriptions, and claims.

BRIEF DESCRIPTION OF THE DRAWINGS

FIG. 3 illustrates one embodiment of an upgraded optical receiver for the optical communication system of FIG. 1;

FIG. 4 illustrates one embodiment of a method for upgrading the optical communication system of FIG. 1;

DETAILED DESCRIPTION OF THE INVENTION

Figure 1:
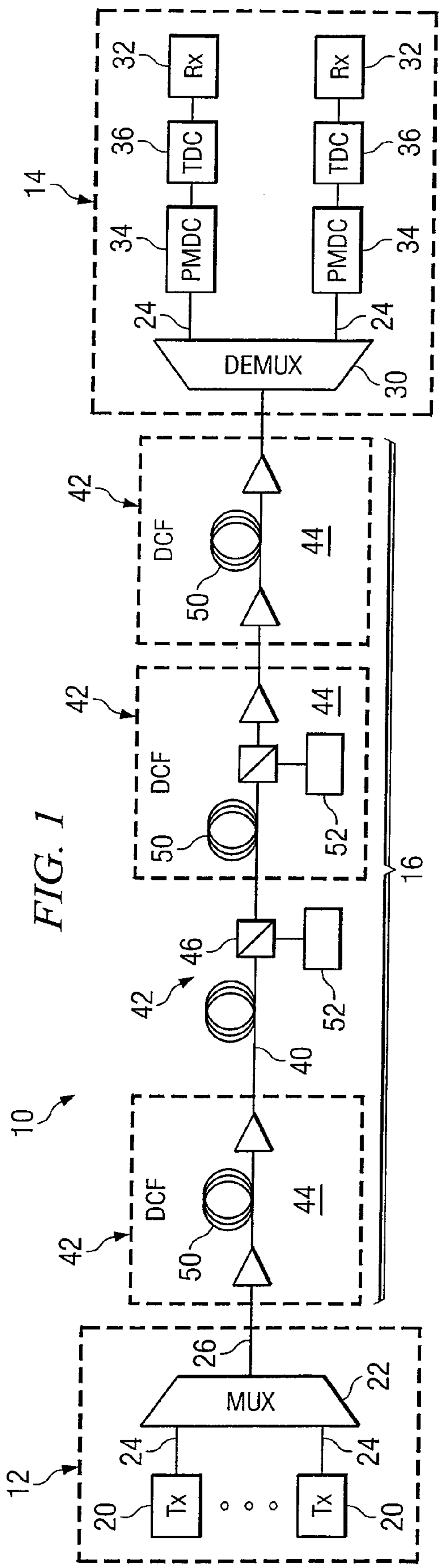
FIG. 1 illustrates one embodiment of an optical communication system.

FIG. 1 illustrates an optical communication system 10 in accordance with one embodiment of the present invention. In this embodiment, the optical communication system 10 is a wavelength division multiplexed (WDM) system such as a dense WDM (DWDM) system in which a number of optical channels are carried over a common path at disparate wavelengths. It will be understood that the optical communication system 10 may comprise other suitable single channel, multichannel or bi-directional transmission systems.

Referring to FIG. 1, the WDM system 10 includes a WDM transmitter 12 at a source end point or node and a WDM receiver 14 at a destination end point or node coupled together by an optical link 16. The WDM transmitter 12 and WDM receiver 14 each comprise a card shelf or other module including transmitters, receivers, a switch fabric and control. The WDM transmitter 12 transmits data in a plurality of optical signals, or channels, over the optical link 16 to the remotely located WDM receiver 14. The WDM transmitter 12, WDM receiver 14 and optical link 16 may form part of a long-haul, metro ring, metro core or other suitable network or combination of networks.

The WDM transmitter 12 includes a plurality of optical transmitters 20 and a WDM multiplexer 22. The optical transmitters 20 may form part of a transponder or other node element. Each optical transmitter 20 generates an optical information signal 24 on one of a set of distinct wavelengths $\lambda_1, \lambda_2 \ldots \lambda_n$ at a certain channel spacing. For example, in a particular embodiment, channel spacing may be 100 Gigahertz (GHz). The channel spacing may be selected to avoid or minimize crosstalk between adjacent channels. The optical information signals 24 comprise optical signals with at least one characteristic modulated to encode audio, video, textual, real-time, non-real-time or other suitable data. The optical information signals 24 are multiplexed into a single WDM signal 26 by the WDM multiplexer 22 for transmission on the optical link 16. The optical information signals 24 may be otherwise suitably combined into the WDM signal 26.

The WDM receiver 14 receives, separates and decodes the optical information signals 24 to recover the included data. In one embodiment, the WDM receiver 14 includes a WDM demultiplexer 30 and a plurality of optical receivers 32. Each optical receiver 32 may be coupled to the demultiplexer 30 through a polarization mode dispersion compensator (PMDC) 34 and a tunable chromatic dispersion compensator (TDC) 36. The optical receiver 32 may form part of a transponder or other node element.

The WDM demultiplexer 30 demultiplexes the optical information signals 24 from the single WDM signal 26 and sends each optical information signal 24 to a corresponding PMDC 34, TDC 36 and optical receiver 32. Each PMDC 34 compensates for polarization mode dispersion. Each TDC 36 compensates for chromatic dispersion. Each optical receiver 32 optically or electrically recovers the encoded data from the corresponding signal 24. As used herein, the term each means every one of at least a subset of the identified items.

The optical link 16 comprises optical fiber 40 or other suitable medium in which optical signals may be transmitted with low loss. In one embodiment, the optical fiber 40 may comprise SMF fiber. Interposed along the optical link 16 are one or more optical amplifiers 42. The optical amplifiers 42 increase the strength, or boost, one or more of the optical information signals 24, and thus the WDM signal 26, without the need for optical-to-electrical conversion.

In one embodiment, the optical amplifiers 42 comprise discrete amplifiers 44 and distributed amplifiers 46. The discrete amplifiers 44 comprise rare earth doped fiber amplifiers, such as Erbium doped fiber amplifiers (EDFAs), and other suitable amplifiers operable to amplify the WDM signal 26 at a point in the optical link 16. The optical amplifiers 2 may include dispersion compensation fiber (DCF) 50 to provide in-line dispersion compensation control.

The distributed amplifiers 46 amplify the WDM signal 26 along an extended length of the optical link 16. In one embodiment, the distributed amplifier 46 comprises a distributed Raman amplifier (DRA). The DRA 46 may include one or more backward, or counter-pumping source lasers 52 coupled to the optical link 16. The amplification signal from the counter-pumping laser 52 is launched in a direction of travel opposite that of the WDM signal 26 and thus is counter-propagated with respect to the WDM signal 26. The DRA 46 may include one or more forward, or co-propagating pumping source lasers coupled to the optical link 16. The amplification signal from the forward-pumping laser is launched in the same direction of travel as the WDM signal 26 and thus is co-propagated with respect to the WDM signal 26.

The Raman pump source 52 comprises semiconductor or other suitable lasers capable of generating a pump light, or amplification signal, capable of amplifying the WDM signal 26 including one, more or all of the included optical information signals 24. The pump source 52 may be depolarized, polarization scrambled or polarization multiplexed to minimize polarization sensitivity of Raman gain.

The WDM transmitter 12, WDM receiver 14 and link 16 are selected, designed and configured to transmit data at a specified or otherwise defined bit rate. For example, in operation each optical transmitter 20 may transmit a 10 Gigabits per second (Gbit/s), 20 Gbit/s, 40 Gbit/s, 80 Gbit/s or 160 Gbit/s channel. These channel rates may represent or approximate the actual bits per second transmitted. For example, a 40 Gbit/s channel may carry 40 Gbits/s payload data and 3 Gbits/s of additional overhead bits. Thus, a 40 Gbit/s channel transmits approximately 40 Gbit/s data, and in the above example, transmits a total of 43 Gbit/s.

The electronics of the optical transmitter 20 as well as the optical components of the WDM transmitter 12, optical components of the link 16, optical components of the WDM receiver 14 and the electronics of the optical receiver 32 are all selected, configured, positioned or otherwise designed for transmission at the defined bit rate. Thus, at the defined bit rate, dispersion, nonlinear effects, optical signal-to-noise ratio (OSNR), bit error rate (BER) and/or Q factor are within acceptable tolerances. For example, the DRA 46 is designed to obtain high chromatic dispersion compensation and high OSNR at the designed bit rate. In a particular example, the WDM transmitter 12 may have an installed base of 40 Gbit/s non return-to-zero (NRZ) transmitters 20 each transmitting a 40 Gbit/s channel transporting 43 Gbit/s of data. In this embodiment, the NRZ transmitters 20 each operate at a corresponding 40 Gigahertz (GHz) clock rate and the optical components of the WDM transmitter 12 are all configured for 40 Gbit/s channels. Similarly, the WDM receiver 14 may have an installed base of NRZ receivers 32 each receiving and recovering a 40 Gbit/s channel and optical components configured for 40 Gbit/s channel. The link 16 may have installed and configured optical components such as amplifiers 42 and dispersion compensation controls configured for the 40 Gbit/s channels.

As described in more detail below, the transmission of one, some or all of the channels may be upgraded to double or otherwise increase the designed for, or defined, bit rate of each channel while maintaining the electronics speed of the WDM transmitter 12 and the WDM receiver 14 as well as the installed post-transmitter optical components of the WDM transmitter 12, the installed pre-receiver optical components of the WDM receiver 14 and the installed optical components of the link 16. Accordingly, an upgrade may be implemented in a short period of time with lower equipment and operational cost on a per bit basis.

The optical transmitters 20 may each be upgraded to a return-to-zero M-ary phase shift keying (RZ-mPSK) transmitter each capable of encoding a plurality of data streams each at the system designed bit rate to generate a RZ-mPSK signal having a combined bit rate that is a multiple of the system designed bit rate. The data streams may comprise discrete data streams or different portions of a common data stream. Similarly, the optical receivers 32 may each be upgraded to RZ-mPSK receivers each capable of decoding and recovering the plurality of data streams at the system designed bit rate.

In the RZ-mPSK format, information is encoded in the phase of the optical signal such that the phase takes one of the M possible values. Because each value of the phase corresponds to a L bits, the symbol rate ("S") is the bit rate ("B") divided by L, where M is equal to $2^L$. Thus the transmission bit rate requires the use of only B divided by L rate electronics.

In a particular embodiment, an installed NRZ transmitter 20 is upgraded to a return-to-zero differential quadrature phase shift keying (RZ-DQPSK) transmitter and a corresponding NRZ receiver 32 is upgraded to a RZ-DQPSK receiver. One, some or all of the transmitters and receivers may be upgraded. Thus, the WDM system may be upgraded on a pay as you go basis. In this embodiment, the phase of the optical signal takes one of four possible values: 0, π/2, π and 3π/2. Since each value of the phase corresponds to a pair of bits, the symbol rate is exactly half the combined bit rate, which is the initial, designed for bit rate. The bit rate thus requires the use of only B/2 electronics. RZ-DQPSK has a compact spectrum and high tolerance to non-linear effects. The resulting upgraded DWM system may have a Q factor that is only 2 dB or less, and even 1 dB, compared to an NRZ based system. Details of the RZ-DQPSK transmitter and RZ-DQPSK receiver are described in connection with FIGS. 2 and 3, respectively.

Figure 2:
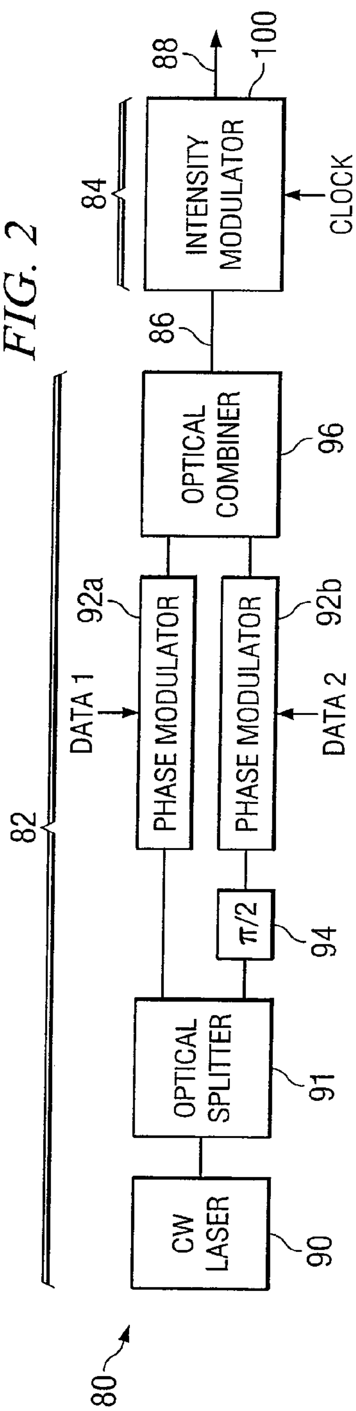
FIG. 2 illustrates one embodiment of an upgraded optical transmitter for the optical communication system of FIG. 1.

FIG. 2 illustrates details of an RZ-DQPSK optical transmitter 80 in accordance with one embodiment. The RZ-DQPSK optical transmitter 80 may be used to replace, or upgrade, existing NRZ or other installed, designed for transmitter 20. As described in more detail below, the RZ-DQPSK transmitter 80 is a multi-stage modulator. A first stage 82 encodes a set of data streams into a DQPSK signal 86. A second stage 84 modulates the first stage DQPSK signal 86 using intensity modulation to generate an RZ-DQPSK signal 88. The first stage 82 and the second stage 84 may be transposed in order. Moreover, the RZ-DQPSK transmitter 80 may include other or different suitable stages and may be otherwise arranged. For example, RZ-DQPSK transmitter 80 may instead modulate a signal using intensity and then DQPSK modulate the intensity modulated signal. In addition, while the present invention is described in connection with an optical communications system, the RZ-DQPSK or other RZ-mPSK transmitters may also be employed in other suitable systems, such as microwave communication systems, for example, to enhance transmission capacity.

The first stage 82 includes a continuous wave laser 90, an optical power splitter 91, a plurality of phase modulators 92, a phase shifter 94, and an optical power combiner 96 coupled by a plurality of optical links. The optical links form a first, or upper arm, and a second, or lower arm, between power splitter 91 and power combiner 96. A first phase modulator 92*a* is coupled to the upper arm while the phase shifter 94 and a second phase modulator 92*b* is coupled to the lower arm, or vice versa.

In particular, the optical links connects power splitter 91 with the first phase modulator 92*a* and the phase shifter 94. The optical link connects the first phase modulator 92*a* with the power combiner 96. The optical links connect the phase shifter 94 with a second phase modulator 92*b* and the second phase modulator 92*b* with the power combiner 96. Each optical link may be an optical fiber and may be formed with varying types of materials that affect the transport characteristics of light flows along optical link. The first stage 82 and/or other portion of the RZ-DQPSK transmitter 80 may be implemented as a planar light wave circuit, discrete elements connected by optical fiber, free space optics or suitably otherwise.

Continuous wave laser 90 is an optical light source emitter, operable to generate a carrier signal at a prescribed or selected frequency with good wavelength control. As used herein, continuous wave means a substantially constant, continuous, steady, or otherwise ongoing signal as opposed to a pulse or burst signal. Continuous wave laser 90 may be a distributed feedback laser, tunable laser, non-tunable laser or other suitable energy source operable to provide light energy. Typically, the wavelengths emitted by continuous wave laser 90 are selected to be within the 1500 nanometer (nm) range, the range at which the minimum signal attenuation occurs for silica-based optical fibers. More particularly, the wavelengths are generally selected to be in the range from 1310 to 1650 nanometers but may be suitably varied.

Power splitter 91 is any device operable to split an ingress signal into discrete signals or otherwise passively generate discrete signals based on the ingress signal. The discrete signals may be identical in form and/or process or may suitably differ. The power splitter 91 may be a polarization beam splitter operable to split the ingress signal into discrete signals or otherwise passively generate discrete signals of disparate polarization states based on the ingress signal. In one embodiment, the power splitter 91 may be a three-dB optical coupler.

The power splitter 91 splits the carrier signal from the laser 90 into a first portion for modulation by the first phase modulator 92*a* and a second portion for modulation by the second phase modulator 92*b*. The phase shifter 94 is operable to adjust the relative phase between the two portions of the carrier signal to an integer multiple of π/2. The phase shifter 94 may be realized in implicit manner, e.g. slight difference in the optical path difference between the arms, so that it is not distinctively recognizable in the actual implementation.

The phase modulators 92 each receive a data signal and modulate the phase of the received portion of the carrier signal based on the data signal. In particular, the first phase modulator 92*a* modulates the first portion of the carrier signal with a first data stream (data 1). The second phase modulator 92*b* modulates the second portion of the carrier signal with a second data signal (data 2). As previously discussed, the first and second data signals may be from discrete sources or may be portions of a common signal. Thus, when a transmitter 20 is upgraded, the first signal prior to upgrade may be transmitted after the upgrade along with an additional signal. Alternatively, a higher bit rate signal may instead be transmitted with a first portion now being the first data signal and the second portion being the second data signal. Thus, the phases of the signals are differentially encoded. The data signals may be precoded NRZ data signals each at the system designed bit rate. Thus, for example, the speed of the electronics need not be upgraded.

The optical combiner 96 is any device operable to receive a plurality of signals and combine or otherwise passively generate a combined signal based on the received signals. The power combiner 96 may be a polarization beam splitter operable to receive a plurality of signals and combine or otherwise passively generate a combined signal based on the received signals and their associated polarization, or a 3-dB optical coupler.

The second stage 84 includes an intensity, or clock, modulator 100. The intensity modulator 100 is operable to modulate the intensity of, or remodulate, the DQPSK signal 86 based on a clock signal. The clock signal may correspond to the designed bit rate. It is a symbol synchronous sinusoidal clock signal, synchronized with the data signal. Other suitable signals or data may be used to provide the data by which intensity modulator 100 modulates the DQSPK signal 86 to generate, or form, the RZ-DQPSK signal 88. Where the first and second data streams each comprise precoded 43 Gbit/s NRZ data streams, the clock signal may comprise a 43 GHz clock to generate an 86 Gbit/s RZ-DQPSK signal 88. The resultant RZ-DQPSK signal 88 has an RZ-like intensity waveform with all marks and fifty percent duty ratio, while the data are encoded in the optical phase of each RZ pulse.

The intensity modulator 100 may be a Mach-Zehnder interferometer (MZI) or other suitable optical component operable to induce an additional phase shift in one of the arms of the interferometer through voltage-induced refractive index changes and to then combine the portions to generate specified interference and a resultant output signal.

In the MZI embodiment, the refractive index of electro-optic material (such as LiNb03) can be changed by applying an external voltage. The interferometer splits the DQPSK signal 86 into two interferometer paths and then combines the two paths interferometrically to generate the RZ-DQPSK signal 88. The MZI may include a power splitter to split the received optical signal and a power combiner to combine the first and second potions of the signal. Path signals are combined such that there is a constructive interference between two signals in the absence of external voltage. The additional phase shift, introduced in one of the arms of the MZI through voltage-induced index changes, destroys the constructive interference and reduces the transmitted intensity. In particular, there is a complete or substantially complete destructive interference between path signals when the phase difference between two arms equals to π (180 degrees).

In a particular embodiment, continuous wave laser 90 may be mathematically expressed, for example, as A cos($2\pi f_c t$), where A is amplitude, $f_c$ is the carrier frequency, and t is time. In QPSK modulation, the phase of the carrier signal is modulated and takes on values from the set [0°, 90°, 180°, 270°] corresponding to the symbol set [00, 01, 10, 11], respectively. The RZ-DQPSK signal 88 is intensity modulated DQPSK signal 86 based on a symbol synchronous clock signal, synchronized with the data signal.

FIG. 3 illustrates one embodiment of an RZ-DQPSK optical receiver 120. The RZ-DQPSK receiver 120 may be used to upgrade, or replace, installed, designed for receivers 32. The RZ-DQPSK receiver 120 includes an optical splitter 122, a first interferometer 124 coupled by optical link to a first, or upper arm 126 of the optical splitter and a second interferometer 128 coupled by optical link to a second, or lower arm 130 of the optical splitter. A first balanced receiver 132 is coupled by optical link to the first interferometer 124. A second balanced receiver 134 is coupled by optical link to the second interferometer 128. The DQPSK receiver 120 may be implemented using discrete elements coupled by optical links, planar waveguide circuit, free space optics and the suitably otherwise.

The optical splitter 122 may be the same type of splitter as optical splitter 91 of the RZ-DQPSK transmitter 80 and may split an ingress signal into a first portion provided on the first, or upper arm 126 and a second portion provided on the second, or lower arm 130.

The interferometers 124 and 128 may each comprise MZIs. In this embodiment, each MZI 124 and 128 includes an upper arm and a lower arm. In each MZI 124 and 128, the phase modulated signal received from the optical splitter 122 is converted to an intensity modulated signal by optically delaying one portion of the signal with respect to the other and applying additional phase shift between the two arms of the MZI. The amount of optical delays equal approximately to the symbol period, which is equal in the DQPSK embodiment to two divided by the combined bit rate. The amount of applied phase shift is equal to π/4 for the first MZI 124 and −π/4 for the second MZI 128. In each MZI 124 and 128, the signal is combined interferometrically. The MZIs are adjusted to achieve complete or substantially complete constructive interference at one output port and complete or substantially complete destructive interference at the other output port such that the data signals can be received by the balanced receivers.

The balanced receivers 132 and 134 each include two photodetectors, one for each output of the corresponding MZI 124 or 128. The signal at the output port of each MZI 124 or 128 is detected by the two separate photodetectors. The current of one photodetector is subtracted from the other to recover the corresponding data stream. The first balanced receiver 132 recovers the first corresponding data stream while the second balanced receiver 134 recovers the second data stream.

FIG. 4 illustrates one embodiment of a method for upgrading an optical communications system to double or otherwise enhance transmission capacity. In this embodiment, an existing system is designed for NRZ 40 Gbit/s channels. It will be understood that the method may be used in connection with channels of other rates to double or otherwise increase transmission capacity.

The method begins at step 150 in which an existing, installed and operating transmitter 20 transmitting a first 40 Gbit/s channel is replaced with an RZ-DQPSK transmitter 80. Next, at step 152, the first 40 Gbit/s channel is coupled to a first phase modulator 92*a* of the RZ-DQPSK transmitter 80. At step 154, a second 40 Gbit/s channel is coupled to a second phase modulator 92*b* of the RZ-DQPSK transmitter 80. Thus, the same 40 Gbit/s speed electronics are employed.

Proceeding to step 156, the multiplexer 22 and other post-transmitter optical components of the WDM transmitter 12 are maintained. At step 158, the transmission fiber and path, including length, are maintained. At step 160, amplifiers 42 including DCF's are maintained. At step 162, the demultiplexer 30 and other pre-receiver optical components of the WDM receiver 14 are maintained.

At step 164, an existing receiver installed to receive the first 40 Gbit/s channel is replaced with an RZ-DQPSK receiver 120. At step 166, an output of the first balanced receiver 132 is coupled to a port for the first channel. At step 168, an output of the second balanced receiver 134 is coupled to a port for the second channel. Thus, only the transmitter 20 and receiver 32 need be upgraded and the remaining optical components may be maintained. It will be understood that one or more of the optical components may be suitably modified. In operation, the first and second channels are combined into and transmitted in an RZ-DQPSK signal 88 from the upgraded WDM transmitter 12 to the upgraded WDM receiver 14. At the upgraded WDM receiver 14, the first and second channels are separately recovered.

Figure 5:
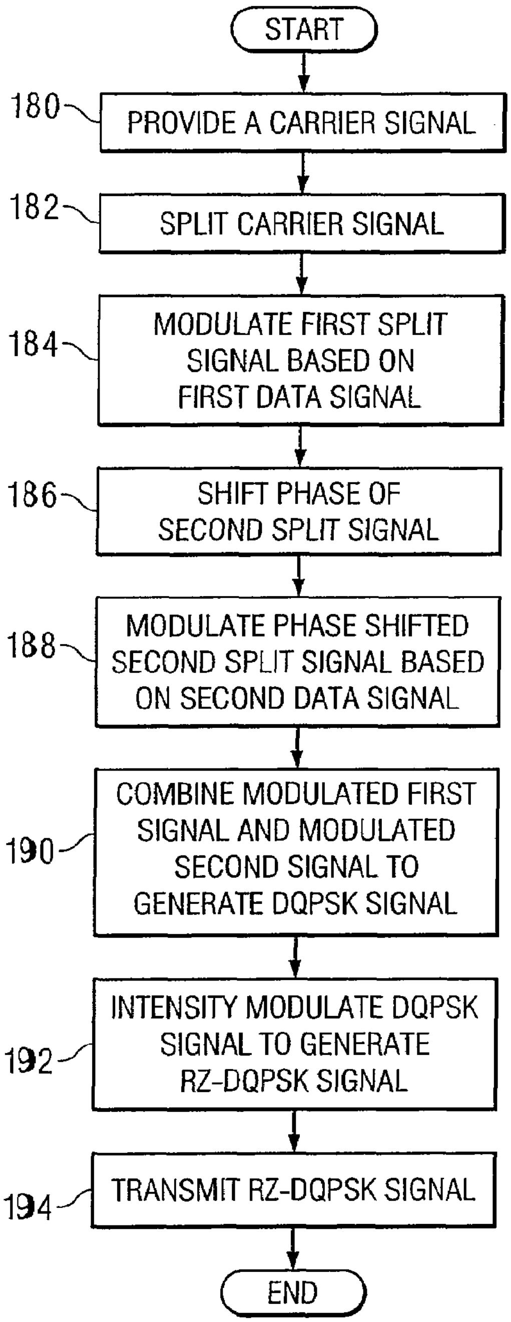
FIG. 5 illustrates one embodiment of a method for transmitting a signal in the upgraded optical communication system of FIG. 1.

FIG. 5 illustrates one embodiment of a method for transmitting an RZ-DQPSK signal 88. In this embodiment, intensity modulation independent of the signal is performed at the second stage 84, with phase modulation being performed at the first stage 82.

The process begins at step 180 wherein a carrier signal is provided. As described above, this step may be performed by a local oscillator or continuous wave laser 90, or other means suitable to produce a carrier signal. Next, at step 182, the carrier signal is split into two discrete arms. As described above, this step may be, for example, performed by the power splitter 91.

At step 184, the first split signal is phase modulated based on a first data signal. This step may be performed by the first phase modulator 92*a*. Next, at step 186, the phase of the second split signal is shifted by π/2 radians. As described above, this may be performed by the phase shifter 94. Next, at step 188, the phase shifted second split signal is phase modulated based on a second data signal. This step may be performed by the second phase modulator 92*b*.

Next, at step 190, the modulated first signal and the modulated second signal are combined to form a DQPSK signal 86. This step may be performed by the power combiner 96. At step 192, the DQPSK signal 86 is intensity modulated. This step may be performed by intensity modulator 100. Next, at step 140, the resulting RZ-DQPSK signal 88 is transmitted and the process ends.

Figure 6:
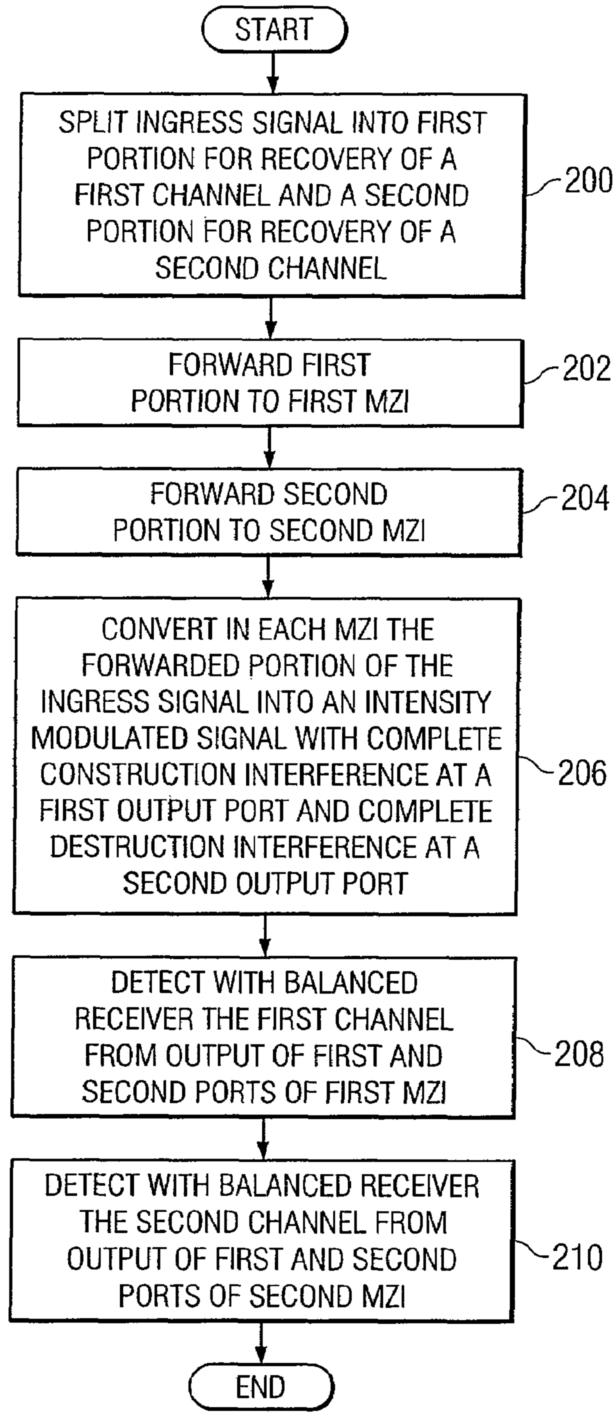
FIG. 6 illustrates one embodiment of a method for receiving a signal in the upgraded optical communication system of FIG. 1.

FIG. 6 illustrates one embodiment of a method for receiving an RZ-DQPSK signal 88. In this embodiment, a set of balanced receivers is utilized which typically provide a 3 dB improvement in OSNR over single port detectors.

The method begins at step 200 in which ingress signal is split into a first portion for recovering a first channel and a second portion for recovering a second channel. This may be performed by power splitter. At step 202, a first portion is forwarded to a first MZI 124. At step 204, a second portion is forwarded to a second MZI 128.

Next, at step 206, in each MZI 124 or 128, the forwarded portion of the ingress signal is converted into an intensity modulated signal with complete or substantially complete constructive interference at a first output port and complete or substantially complete destructive interference at a second output port. At step 208, the first channel is detected with the first balance receiver 132 coupled to the first and second output ports of the first MZI 124. At step 210, the second channel is detected with the second balanced receiver 134 coupled to the output ports of the second MZI 128. In this way, an RZ-DQPSK signal 88 may be detected utilizing electronics operating at half the combined bit rate of the RZ-DQPSK signal.

Although the present invention has been described with several embodiments, various changes and modifications may be suggested to one skilled in the art. It is intended that the present invention encompass its changes and modifications as fall within the scope of the appended claims.

What is claimed is:

1. A wavelength division multiplexed (WDM) optical communication system, comprising:

an upgraded transmitter utilized in place of a replaced transmitter that transmitted payload data over a channel at a defined bit rate, the upgraded transmitter operable to transmit the payload data and at least one other payload data in a combined M-ary phase shift keying (mPSK) signal having a combined bit rate of at least twice a system designed bit rate and a symbol rate approximately equal to the system designed bit rate;

an upgraded receiver utilized in place of a replaced receiver that recovered the payload data at the defined bit rate, the upgraded receiver operable to recover the payload data and the at least one other payload data from the mPSK signal having the symbol rate approximately equal to the system designed bit rate; and post-transmitter, in-line and pre-receiver optical components configured for the defined bit rate utilized to communicate the mPSK signal between the upgraded transmitter and the upgraded receiver at the combined bit rate.

2. The WDM optical communication system of claim 1, wherein the post-transmitter optical components comprise a multiplexer.

3. The WDM optical communication system of claim 1, wherein the pre-receiver optical components comprise a demultiplexer.

4. The WDM optical communication system of claim 3, wherein the pre-receiver optical components further comprise tunable chromatic dispersion compensators and polarization mode dispersion compensator coupled between the demultiplexer and the upgraded receiver.

5. The WDM optical communication system of claim 1, wherein the in-line optical components comprise distributed Raman amplifiers and/or discrete EDFA amplifiers.

6. The WDM optical communication system of claim 5, wherein the in-line optical components further comprise in-line dispersion compensators.

7. A wavelength division multiplexed (WDM) optical communication system, comprising:

an upgraded transmitter utilized in place of a replaced transmitter that transmitted a payload data at a defined bit rate, the upgraded transmitter operable to transmit the payload data and at least one other payload data in a combined M-ary phase shift keying (mPSK) signal having a combined bit rate of at least twice the defined bit ra te and having a symbol rate approximately equal to the bit rate;

an upgraded receiver utilized in place of a replaced receiver that recovered the payload data at the bit rate approximately equal to the defined bit rate, the upgraded receiver operable to recover the payload data and the at least one other payload data from the mPSK signal having the symbol rate approximately equal to the bit rate; and post-transmitter, in-line and pre-receiver optical components configured for the bit rate utilized to communicate the mPSK signal between the upgraded transmitter and the upgraded receiver at the combined bit rate.

8. The WDM optical communication system of claim 7, wherein the mPSK signal is a return-to-zero mPSK signal (RZ-mPSK).

* * * * *